US006301408B1

(12) United States Patent
Espindola et al.

(10) Patent No.: US 6,301,408 B1
(45) Date of Patent: Oct. 9, 2001

(54) TAPERED OPTICAL FIBER GRATING DEVICES WITH VARIABLE INDEX COATINGS FOR MODIFYING GUIDE PROPERTIES OF THE FUNDAMENTAL MODE

(75) Inventors: Rolando Patricio Espindola, Chatham; Andrew John Stentz, Clinton, both of NJ (US); Jefferson Lynn Wagener, Aberdeen, WA (US)

(73) Assignee: Lucent Technologies Inc, Murray Hill, NJ (US)

( * ) Notice: Subject to any disclaimer, the term of this patent is extended or adjusted under 35 U.S.C. 154(b) by 0 days.

(21) Appl. No.: 09/152,893

(22) Filed: Sep. 24, 1998

(51) Int. Cl.$^7$ ........................................ G02B 6/34
(52) U.S. Cl. ................................. 385/37; 385/43
(58) Field of Search ................. 385/37, 43, 27, 385/28, 29, 31

(56) References Cited

U.S. PATENT DOCUMENTS

| 5,007,705 | | 4/1991 | Morey et al. . |
| 5,082,629 | * | 1/1992 | Burgess, Jr. et al. ............. 422/82.11 |
| 5,392,308 | * | 2/1995 | Welch et al. ............................. 372/92 |
| 5,418,871 | * | 5/1995 | Revelli, Jr. et al. .................... 385/44 |
| 5,420,948 | | 5/1995 | Byron . |
| 5,473,714 | | 12/1995 | Vengsarkar . |
| 5,513,196 | * | 4/1996 | Bischel et al. ........................... 372/22 |
| 5,778,118 | | 7/1998 | Sridhar . |
| 5,912,910 | * | 6/1999 | Sanders et al. ......................... 372/22 |
| 5,990,474 | * | 11/1999 | Atia et al. ............................. 250/234 |
| 6,103,535 | * | 8/2000 | Pilevar et al. ......................... 436/518 |

FOREIGN PATENT DOCUMENTS

| 0 736 784 A2 | 10/1996 | (EP) . |
| 0 862 071 A1 | 9/1998 | (EP) . |
| 2184859 A | 7/1987 | (GB) . |
| WO 96/26458 | 8/1996 | (WO) . |

OTHER PUBLICATIONS

A.M. Vengsarkar et al., "Long–Period Fiber Gratings as Band Rejection Filters," Journal of Lightwave Technology, vol. 14, No. 1, Jan., 1996, pp. 58–65.*

* cited by examiner

Primary Examiner—Frank G. Font
Assistant Examiner—Michael P. Mooney
(74) Attorney, Agent, or Firm—Lowenstein Sandler PC

(57) ABSTRACT

An optical fiber grating device including a length of optical fiber having a predetermined fundamental mode effective guide index and a longitudinally tapered region for accessing a fundamental mode of light. The tapered region has a grating with a predetermined light spectral shaping property that shapes the light spectrum of the fundamental mode. A coating surrounds the tapered region of the fiber for modifying the fundamental mode effective guide index of the fiber in order to change the spectral shaping property of the grating.

18 Claims, 3 Drawing Sheets

US 6,301,408 B1

TAPERED OPTICAL FIBER GRATING DEVICES WITH VARIABLE INDEX COATINGS FOR MODIFYING GUIDE PROPERTIES OF THE FUNDAMENTAL MODE

FIELD OF THE INVENTION

This invention relates to optical fiber grating devices and systems using them. In particular, it concerns tapered optical fiber grating devices with variable index coatings that change the spectral shaping properties of the grating by modifying the effective index of the fundamental mode.

BACKGROUND OF THE INVENTION

Optical fiber gratings are used for spectral shaping in modem telecommunications systems and sensing systems. A typical optical fiber grating includes a periodic or quasiperiodic pattern of refractive index fluctuations or perturbations along an optical fiber. Bragg-based fiber gratings reflect light within a narrow wavelength band and transmit wavelengths of light outside of that band to provide spectral shaping. Long period fiber grating designs couple selected wavelengths of light from the fundamental mode into rapidly attenuated cladding modes to provide spectral shaping. These spectral shaping properties permit fiber gratings to be used as gain equalizers, narrowband filters, dispersion compensators, and shift detectors.

Spectral shaping can also be accomplished with tapered optical fibers. For example, U.S. Pat. No. 5,473,714 issued to Vengsarkar on Dec. 5, 1995, titled "Optical Fiber System Using Tapered Fiber Devices", discloses a tapered fiber device which can be used for optical filtering. The taper of the fiber is dimensioned to permit signals of a first wavelength to pass with little loss while signals of a second wavelength are blocked.

Telecommunications and sensing systems operate under many conditions which cause them to experience spectral changes. Unfortunately, conventional fiber gratings and tapered fibers have static spectral shaping properties which can not be tuned or adjusted to compensate for these changes. Therefore, there is a need for an optical fiber device that can be adjusted or tuned to provide different spectral shaping properties.

SUMMARY

An improved optical fiber grating device comprises a length of optical fiber having a predetermined fundamental mode effective guide index and a longitudinally tapered region for accessing a fundamental mode of light. The tapered region includes a grating having a predetermined light spectral shaping property that shapes the light spectrum of the fundamental mode. A coating surrounds the tapered region of the fiber for modifying the fundamental mode effective guide index of the fiber in order to change the spectral shaping property of the grating.

BRIEF DESCRIPTION OF THE DRAWINGS

The advantages, nature, and various additional features of the invention will appear more fully upon consideration of the illustrative embodiments now to be described in detail in connection with the accompanying drawings wherein.

It is to be understood that these drawings are for purposes of illustrating the concepts of the invention and, except for graphical illustrations, are not to scale.

DETAILED DESCRIPTION OF THE INVENTION

Figure 1:
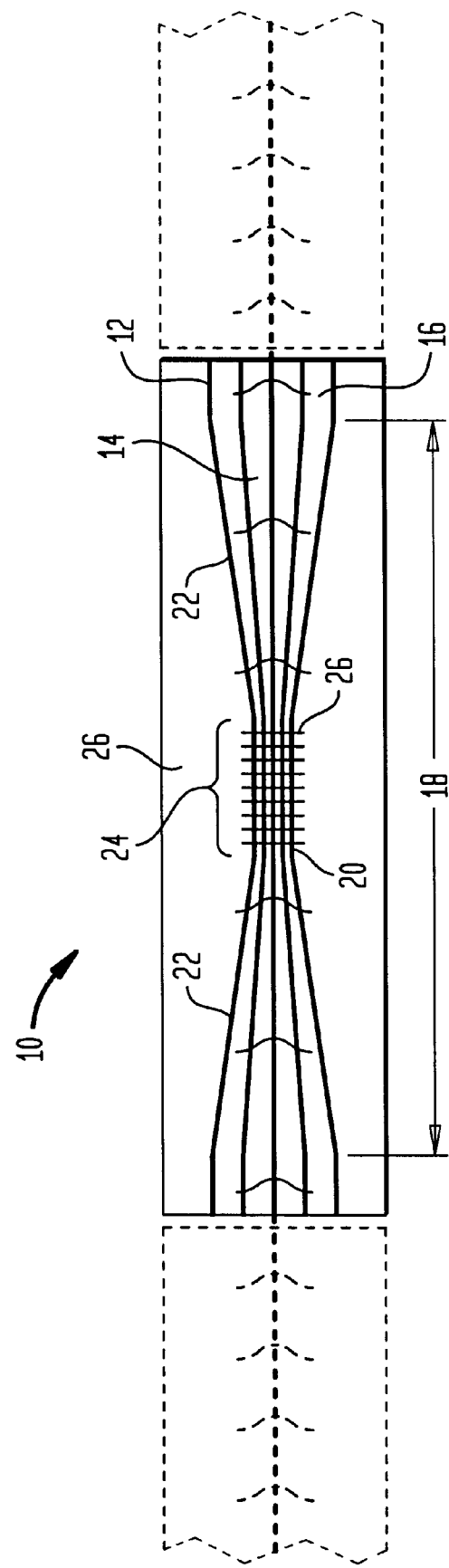
FIG. 1 is a side-cross section of a tapered fiber grating device according to an embodiment of the present invention.

FIG. 1 shows a tapered fiber grating device 10 according to an embodiment of the present invention. The device 10 includes a cladded single mode stepped index or graded index optical fiber 12 having a circular inner core 14 surrounded by at least one cladding layer 16. The core 14 is of a relatively high index of refraction (stepped or graded) and the cladding 16 is of a slightly lower index of refraction as compared to the core 14. The core 14 is typically germanium-doped silica, while the cladding layer 16 is typically silica or fluorine-doped silica. The fiber 12 includes a tapered region 18 which includes a minimum outer diameter section 20 and two adiabatic tapered sections 22. A grating 24 for light spectral shaping, comprising periodic or quasiperiodic refractive index fluctuations (index perturbations) is written in the minimum outer diameter section 20 of the tapered region 18. The tapered region 18, in the area of the grating 24, is covered by a coating 26 of variable index material. Such materials have indices of refraction which can be selectively varied by application of an electric or magnetic field, or by changes in temperature. Materials responsive to electric and magnetic fields typically comprise electro-optic or magneto-optic materials such as liquid crystals. Well known temperature sensitive polymers can be used as heat sensitive variable index coatings.

The tapered region 18 provides lossless operation and causes a non-negligible portion of the fundamental mode M to expand beyond or outside of the cladding 16 into the coating 26 as light passes through the tapered region 18. This is due to the shrinking core diameter $OD_{core}$ which results in weaker bounding of the fundamental mode, and therefore, an expansion of the fundamental mode field diameter. With the fundamental mode M extending outside the cladding 16, the coating 26 can be used to selectively modify the effective guide index of the fundamental mode, thereby permitting the light spectral shaping properties of the grating 24 to be tuned or adjusted.

The grating 24 used in the fiber grating device 10 of the present invention can be constructed as a Bragg-based or short period grating. Such a grating 24 functions as spectrally selective reflector for reflecting a selected narrow band of wavelengths guided by the core of the device and/or as a spectrally selective filter for transmitting only the wavelengths outside of the band. The operating bandwidth of a Bragg-based grating 24 can be broadened by chirping. This involves varying the spacing between successive perturbations from a constant spacing to a spacing which linearly or non-linearly increases (or decreases) for subsequent perturbations. The bandwidth of the reflected signal increases because the chirped grating has a wider range of spacings. A chirped grating is useful in dispersion compensation because the different wavelengths travel different pathlengths before encountering the spacing needed to reflect them. This produces a reflected band that exhibits a wavelength dependent time delay.

The light spectral shaping properties of the grating 24 can be tuned or adjusted by selection of an appropriate material for the coating 26. For example, in applications where heating causes undesirable shifts in the resonant wavelength, the spectral shaping properties of the grating 24 can be made temperature insensitive by using a material for the coating 26 that has a temperature sensitive index of refraction that provides a fundamental mode effective index $n_{eff}$ that does not change with temperature.

The spectral shaping properties of the grating 24 can also be tuned by using a material for the coating 26 that has an index of refraction that substantially changes the effective index $n_{eff}$ of the fundamental mode. Appropriate coating materials can also be selected that make the grating 24 amplitude tunable (strength of the grating 24 can be modulated) by altering the overlap of the fundamental mode with the core region 14 (in the area of the grating 24).

In other embodiments, the grating 24 can be constructed as a long period grating to provide the device with optical mode coupling functions. Long period gratings have index perturbations which are selectively spaced to shift transmitted light in the region of a desired wavelength from the fundamental or core mode into the cladding mode thereby reducing in intensity a band of light centered about the desired wavelength. The use of a long period-based grating 24 allows both the core and cladding modes to be modified simultaneously especially because the overlaps of the core and cladding modes are substantially altered in the tapered region 18. Such a grating can increase coupling to preferred modes and/or reduced coupling to undesirable modes by selectively changing the refractive index of the coating 26 to provide the desired modal overlap.

Varying the index of the coating 26 can also be used for tuning the amplitude of a long period-based grating 24. Moreover, because the effective index $n_{eff}$ of both the fundamental mode and the higher order mode, which the grating 24 couples to, varies in response to changes in the refractive index of the coating 26, amplitude adjustments can be decoupled from wavelength shifts.

The nature and method for making such devices may be more clearly understood by consideration of the following example.

EXAMPLE

A tapered fiber device similar to that shown in FIG. 1 with a temperature insensitive Bragg grating-based grating can be made by starting with a step index fiber with a 1% delta core index, a core $OD_{core}$ of about 5 microns and cladding $OD_{cladding}$ of about 125 microns. The fiber is placed under tension and heated with an oxy-acetylene torch until the fiber begins to stretch. Translating the ends of the fiber at different rates so that the fiber moves through the flame of the torch creates the tapered region. Drawing process typically uses a rate of a about 1 centimeter/minute for one end of the fiber, and a starting translating rate of about 1 centimeter/minute for the second end of the fiber. The translation rate of the second end of the fiber is typically increased to about 39 centimeters/minute in a linear manner over about 6 seconds. This rate is maintained for about 3 seconds and then reduced to about 1 centimeters/minute over about 6 seconds. Such a drawing process produces a tapered region in the fiber having a minimum outer diameter section with a length of about 2 centimeters and an outer diameter $OD_{taper}$ of about 20 microns. The adiabatic tapered sections produce in the tapered region each have a length of about 1 centimeter.

After tapering, a Bragg grating at about 1550 nm is written in the minimum outer diameter section of the tapered region using well known phase mask techniques and about 242 nm UV irradiation. The grating is written to a desired strength by doping a portion of the fiber's silica cladding with fluorine and germanium to increase the cross-sectional area of the UV perturbations. A coating comprised of a variable index polymer material is applied to the completed Bragg grating/tapered region. The polymer has an index of refraction of approximately 1.44 which is slightly lower than the index of silica (1.45), and an index temperature coefficient (dn/dt) of $-2.1 \times 10^{-4}/°C$. Such polymers are well known and commercially available.

The temperature sensitivity ($\Delta\lambda/\lambda$) of the Bragg grating depends essentially on the temperature sensitivity of the effective index of the fundamental mode ($\Delta n/n$) and on the temperature sensitivity of length change of the silica fiber ($\Delta L/L$) which changes the spacings of the grating perturbations. This relationship can be written as:

$$\Delta\lambda/\lambda \approx \Delta n/n + \Delta L/L.$$

The effective index of the fundamental mode is sensitive to the polymer coating and drops by $dn_{eff}/d\Delta n_{polymer} = 0.04$, and the effective index of the mode is sensitive to the silica index change $dn_{eff}/d\Delta n_{silica} \sim 1$. Because the index temperature coefficient dn/dt of silica is $\approx 7.8 \times 10^{-6}/°$ C., the total sensitivity of $n_{eff}$ is changed by the polymer coating from approximately $8 \times 10^{-6}/°$ C. to $-6 \times 10^{-7}/°$ C.

Since silica has a temperature coefficient of length dL/Ldt of $\sim 4 \times 10^{-7}/°$ C. and an index of refraction of 1.45, the Bragg grating temperature sensitivity of the fiber device is:

$$\Delta\lambda/\lambda \approx [-6 \times 10^{-7}/° C.(\Delta n)/1.45(n)] + [4 \times 10^{-7}/° C.(\Delta L/L)] \approx -1 \times 10^{-8}/° C.$$

This is substantially lower than the Bragg grating temperature sensitivity of a conventional fiber device which is:

$$\Delta\lambda/\lambda \approx [8 \times 10^{-6}/° C.(\Delta n)/1.45(n)] + [4 \times 10^{-7}/° C.(\Delta L/L)] \approx 5.8 \times 10^{-6}/° C.$$

Figure 2A:
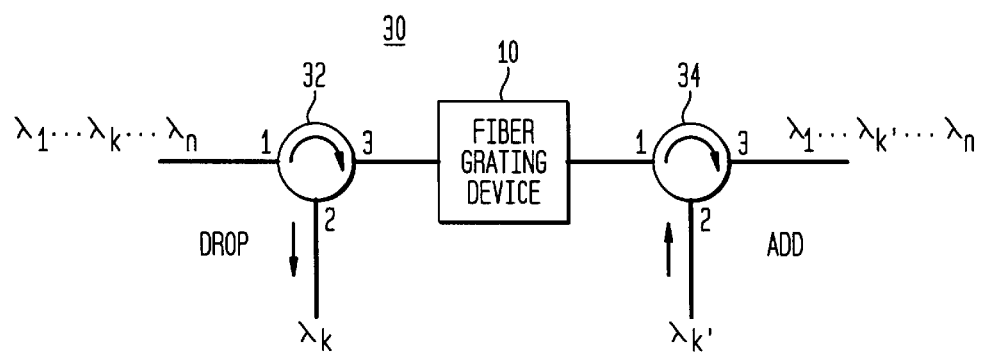
FIG. 2A shows a tunable add/drop multiplexer using a tapered fiber grating device with a Bragg grating that is wavelength tunable via a variable index coating.

FIG. 2A shows a tunable add/drop multiplexer 30 utilizing a taped fiber grating device 10 with a Bragg grating that is wavelength tunable via a variable index coating. The tapered fiber grating device 10 is located between first and second optical circulators 32, 34. A selected optical channel may be dropped or added by tuning the Bragg grating wavelength using the variable index coating of the fiber grating device 10. In the drop function, channels 1 through n at wavelengths $\lambda_1$ to $\lambda_n$, enter port 1 of the first circulator 32. Channel k at wavelength $\lambda_k$ (to be dropped) is reflected by the fiber grating device 10 and exits port 2 of the first circulator 32 while the other channels exit port 3 of the first circulator 32. In the add function, a channel with wavelength $\lambda_{k'}$, (where $\lambda_{k'}$ is very close or equal to $\lambda_k$) enters port 2 of the second circulator 34, exits port 1 and is reflected by the fiber grating device 10 and exits port 3 of the second circulator. Different channels can be added or dropped by simply tuning the wavelength of the Bragg grating using the variable refractive index coating of the fiber grating device 10.

More than one optical channel can be added or dropped at a time by broadening the reflection bandwidth to cover more than one channel or wavelength $\lambda$. This can be accomplished by a tapered fiber grating device 10 with a chirped Bragg grating that is wavelength tunable via a variable index coating.

Figure 2B:
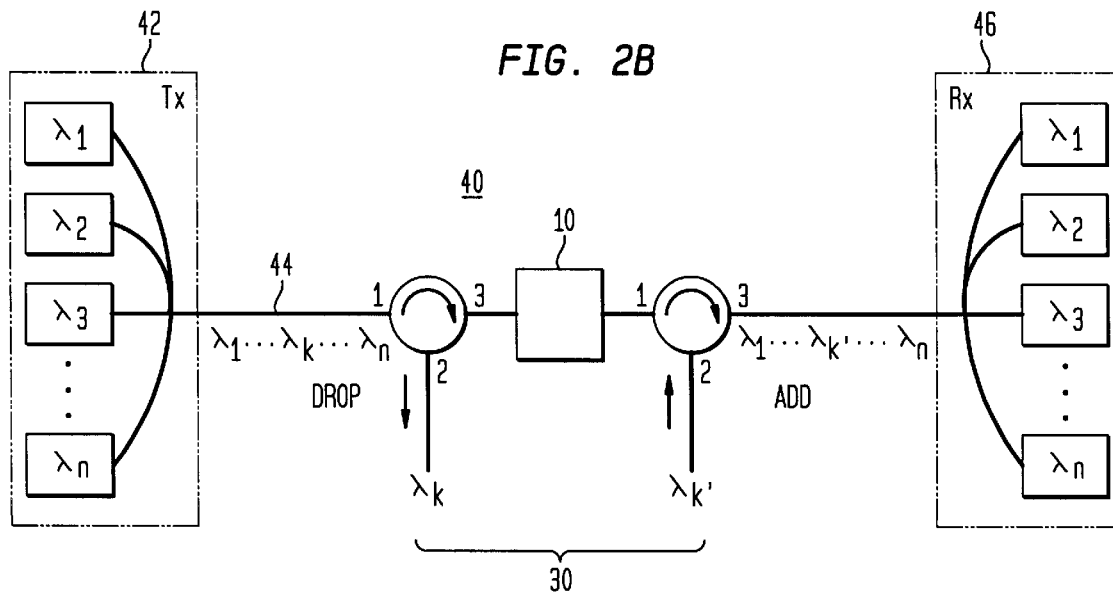
FIG. 2B shows an optical fiber telecommunications system with the tunable add/drop multiplexer of FIG. 2A.

FIG. 2B schematically illustrates an optical fiber telecommunications system 40 with the tunable add/drop multiplexer 30 of FIG. 2A. The system 40 comprises a multiwavelength transmitter 42, a length of optical fiber 44, the tunable add/drop multiplexer 30 with the tapered fiber grating device of the invention 10, and a multiwavelength optical receiver 46.

Figure 3A:
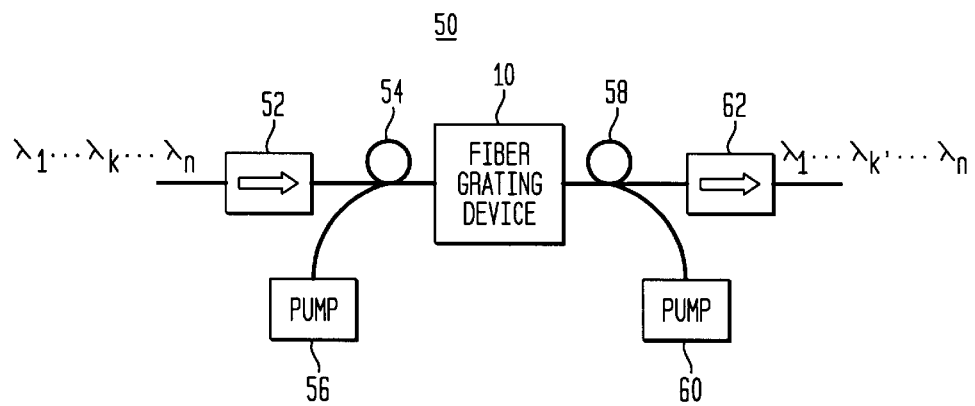
FIG. 3A shows a dynamic gain-flattened optical fiber amplifier which uses at least one tapered fiber grating device with a long period grating whose spectral shaping properties are tunable via a variable index coating.

FIG. 3A shows a dynamic gain-flattened optical fiber amplifier 50 utilizing at least one tapered fiber grating device 10 with a long period grating whose spectral shaping properties are tunable via a variable index coating. The optical amplifier 50 consists of an input isolator 52, a first length of rare-earth doped fiber 54 (such as erbium-doped fiber), an optical pump 56 for optical pumping the first length of rare-earth fiber 54, a second length of rare-earth doped fiber 58, a second optical pump 60 for optical pumping the second length of rare-earth fiber, an output isolator 62, and the tapered fiber grating device 10.

Figure 3B:
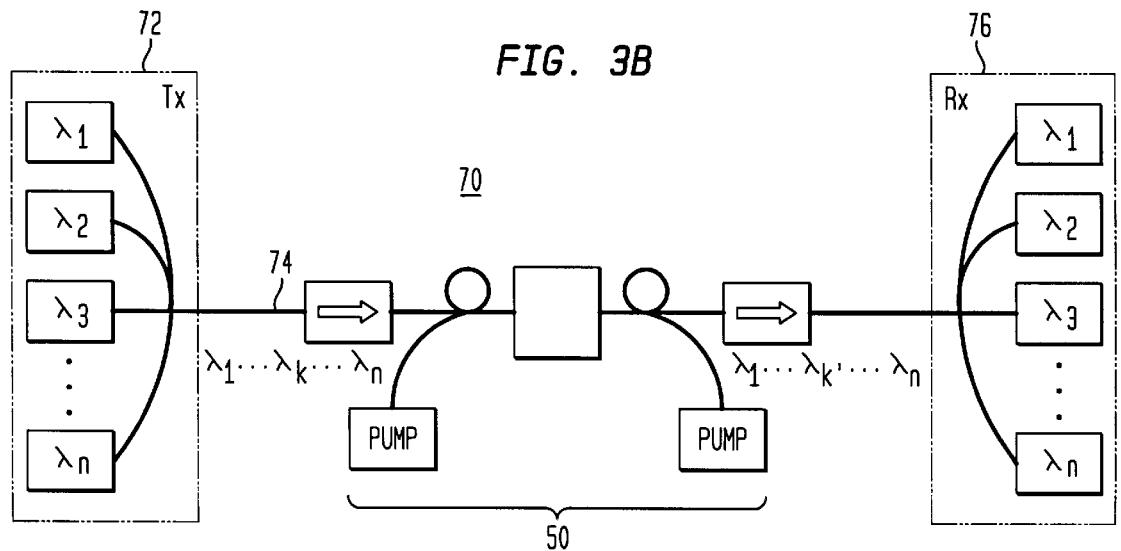
FIG. 3B shows an optical fiber communications system with the gain-flattened optical amplifier of FIG. 3A.

FIG. 3B shows an optical fiber communications system 70 with the gain-flattened optical amplifier 50 of FIG. 3A. The system comprises a multiwavelength transmitter 72, a length of optical fiber 74, the gain-flattened optical amplifier 50 with the tapered fiber grating device 10 of the invention, and a multiwavelength optical receiver 76.

The ability to dynamically adjust a filter shape is important, especially in dense wavelength division fiber optical systems, because the spectral gain of the optical amplifier (like that of an erbium doped amplifier) can change due to the number of channels present or the power level of the channels. By adjusting the filter shape of the tapered fiber grating device 10, the gain-flatness of the optical amplifier 50 can be maintained during varying operating conditions.

While the foregoing invention has been described with reference to the above embodiments, various modifications and changes can be made without departing from the spirit of the present invention. Accordingly, modifications and changes such as those suggested above but not limited thereto are considered to be within the scope of the claims.

What is claimed is:

1. An optical fiber grating device comprising:
   a length of optical fiber having a predetermined fundamental mode effective guide index;
   a longitudinally tapered region formed in the fiber for accessing a fundamental mode of light guided by the fiber, the tapered region comprising two adiabatic tapered sections with a minimum outer diameter section therebetween;
   a grating defined in the minimum outer diameter section of the tapered region, the grating having a predetermined light spectral shaping property that shapes the light spectrum of the fundamental mode; and
   a coating peripherally surrounding the minimum outer diameter section of the tapered region of the fiber for modifying the fundamental mode effective guide index of the fiber in order to change the spectral shaping property of the grating.

2. The fiber grating device according to claim 1, wherein the grating is a Bragg grating.

3. The fiber grating device according to claim 2, wherein the grating is chirped.

4. The fiber grating device according to claim 1, wherein the grating is a long period grating.

5. The fiber grating device according to claim 1, wherein the fiber includes a core region surrounded by at least one cladding region.

6. The fiber grating device according to claim 5, wherein the core has a stepped index.

7. The fiber grating device according to claim 5, wherein the core has a graded index.

8. The fiber grating device according to claim 1, wherein the tapered region of the fiber includes a minimum outer diameter section and at least one adiabatic tapered section.

9. The fiber grating device according to claim 1, wherein the coating comprises a variable index material having an index of refraction that can be selectively varied.

10. The fiber grating device according to claim 9, wherein the variable index material is selected from the group consisting of electro-optic materials, magneto-optic materials and temperature sensitive materials.

11. The fiber grating device according to claim 9, wherein the index of the coating is selected to provide a fundamental mode effective index that does not change with temperature.

12. The fiber grating device according to claim 9, wherein the index of the coating is selected to provide a substantially changed fundamental mode effective index.

13. The fiber grating device according to claim 9, wherein the index of the coating is selected to increase the power of the grating.

14. The fiber grating device according to claim 9, wherein the index of the coating is selected to cause the grating to increase coupling to preferred modes and reduced coupling to undesirable modes.

15. A tunable optical multiplexer comprising first and second optical circulators and the tapered fiber grating device according to claim 1 optically coupled therebetween.

16. An optical fiber telecommunications system comprising a multiwavelength transmitter, a length of optical fiber, a multiwavelength optical receiver, and the tunable multiplexer according to claim 15 optically coupled between the transmitter and the receiver.

17. An optical fiber amplifier a length of rare-earth doped fiber and the tapered fiber grating device according to claim 1.

18. An optical fiber telecommunications system comprising a transmitter, a length of optical fiber, a optical receiver, and the optical fiber amplifier according to claim 15 optically coupled between the transmitter and the receiver.

* * * * *